June 10, 1952   P. N. ADAMS   2,599,882
STABILIZED PIPE REPAIR CLAMP
Filed Jan. 16, 1950
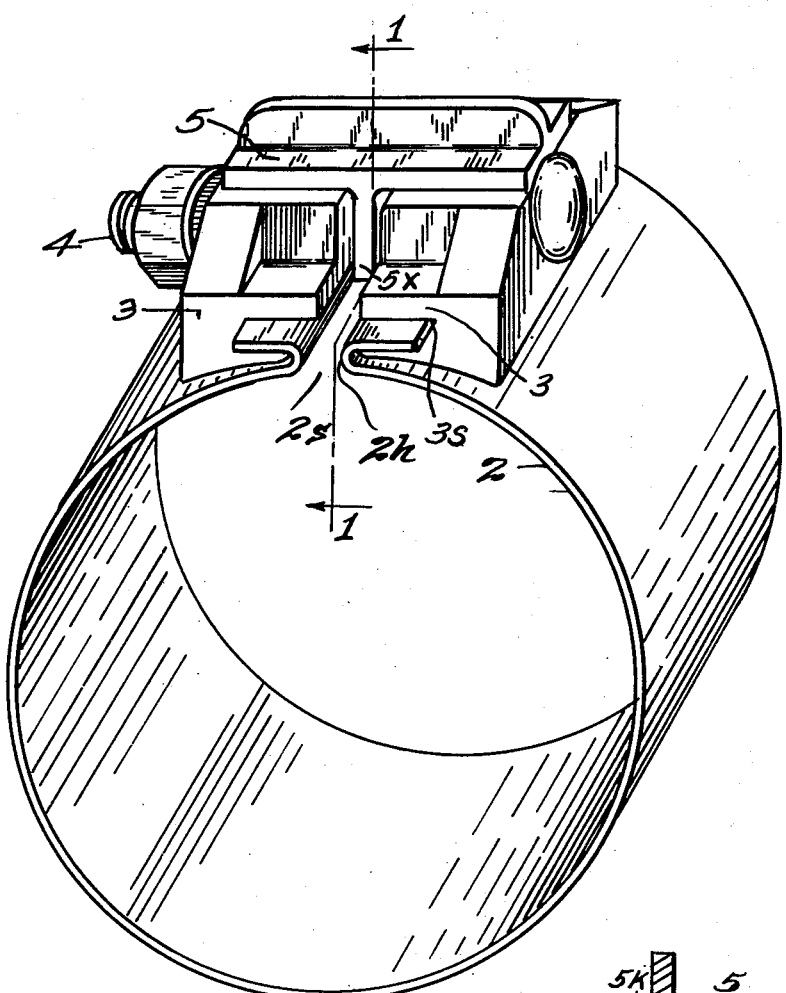
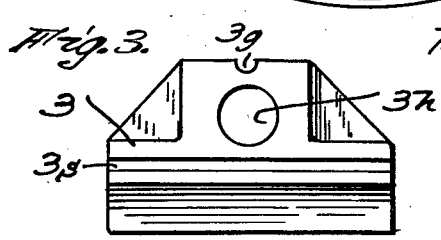
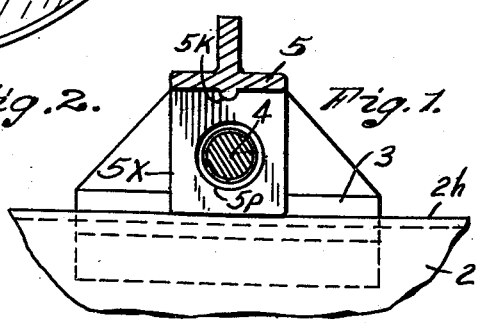
Inventor,
Philip N. Adams;
By Frederick E. Maynard,
Attorney.

Patented June 10, 1952

2,599,882

UNITED STATES PATENT OFFICE 2,599,882

STABILIZED PIPE REPAIR CLAMP

Philip N. Adams, Compton, Calif.

Application January 16, 1950, Serial No. 138,900

2 Claims. (Cl. 24—19)

This invention is a pipe repair clamp in which the clamping bolt is stabilized against flexure under tense strain.

The expired Philbrook Patent No. 1,596,944 shows a longitudinally divided, flexible ring having tangential, opposite saddles in which are provided open top slots into which is laid a transverse bolt for drawing the engaged ends of the ring toward each other. This is for the purpose of contracting the ring for clamping a sealing patch over an aperture at which fluid may leak from a given pipe.

The broad intent of the instant invention is to provide a patch clamp of that type with a simple practical, substantial, inexpensive and highly efficient means whereby to prevent the tensed clamp bolt from bending at a transverse zone thereof just between the inner and contiguous faces of the bolted ends of the ring. Particularly a purpose of the invention is to provide a stabilizer which will effectually prevent the bolt engaged ends of the ring from bending up from the generally tangential position as to the circle of the ring. Such a stabilizer may be embodied in a variety of effective forms for the stated purpose.

The invention resides in certain advancements in this art as set forth in the ensuing disclosure and has, with the above, additional objects and advantages as hereinafter developed, and whose construction, combinations and details of means and the manner of operation will be made manifest in the following description of the herewith illustrative embodiment; it being understood that modifications, variations, adaptations and equivalents may be resorted to within the spirit, scope and principles of the invention as it is claimed in conclusion hereof.

Figure 1 is a vertical cross-section, on line 1—1 of Fig. 2, of the stabilizer as applied to a tensioning bolt and a hook, and a part of a clamp ring.

Figure 2 is a perspective view of the stabilizer assembly on a clamp ring.

Figure 3 is an inner, hooking face elevation of one of the ring draft blocks.

The ring 2 is adapted to be fitted around a respective sized pipe, not shown, having a break or aperture at which the pipe leaks. A suitable sealing patch is interposed between the pipe and the ring and over the aperture and when the ring is tightened the patch will stop the leak, generally.

The ring is longitudinally split at 2s and its ends are turned outwardly tangentially (to the ring) to form substantial hooks 2h of considerable tangential length. There is freely slipped onto each hook a respective draft block 3 whose inner, longitudinal face is provided with an end to end open slot 3s which receives the hook 2h. For the purpose of pulling the applied blocks, one toward the other, a substantial tensioning bolt 4 is passed into bolt holes 3h in the applied pair of blocks.

It will be seen that when heavy tension is created in the bolt it will very powerfully contract the hook end of the ring and therefore contract the ring to clinch up the interposed, not shown, patch on a pipe. After the patch has been firmly set further screwing up of the bolt will begin to bend the hooks on their end portions of the set ring, and eventually an overload of tension will cause the bolt itself to bend at a zone between the hooks.

Means are provided herein to effectively hold the ring hooked draft blocks 3 firmly in the original tangential plane as when first applied to the tangential hooks; that is will prevent the blocks from tilting upward with the roots of the hooks as fulcra.

To that end a stabilizing bridge 5 is so combined with the cooperative blocks 3 that they are held for contracting or clinching movement substantially without a change from the original tangential draft plane. In other words there is provided a bridging means mounted on the blocks and rigidly stabilizing them and providing for their relative shift one toward the other during contraction of the ring.

The bridge herein disclosed has a central, depending lug 5x which is perforated at 5p to receive the bolt when the bridge is in applied position on the two draft blocks. Therefore, the bridge is firmly held down on the blocks when and if there is applied enough bolt tension to begin to tilt the blocks upward with a bending effort on the bolt. A direct advantage had is that a higher tension can be applied to contract the ring without fear of flexing the bolt and losing benefit of the needed tension.

While the stabilizing bridge mounted on the draft blocks permits them to relatively contract it also has the purpose of keeping them in operational alinement and to that end the bridge member has guided motion on the blocks; these having guide apertures 3g to receive complementary keys 5k of the bridge which slide along the guide apertures as the blocks relatively contract.

What is claimed is:

1. A pipe patch clamp of the kind set forth and including a sleeve longitudinally split along one side and having laterally spaced, oppositely directed draft hooks, one at each split-end of the band and tangential to the sleeve, draft blocks having longitudinal apertures in their inner faces into which said hooks fit and which blocks are provided with coplanar top faces, a clamp screw passing over said hooks and piercing said blocks transversely to the sleeve axis, a nut on the screw for relatively closing the blocks and thereby contracting the split sleeve, and a stabilizing member connected to the screw intermediately of the blocks and transversely bridging and sliding on said top faces of the blocks to hold them in coplanar position while being drawn together.

2. A pipe patch clamp of the class described and including a sleeve longitudinally split along one side, blocks tangential to the sleeve attached in parallel relation to the ends of the sleeve along the split portion, a clamp screw passing through the blocks transversely to the sleeve and having a tensioning nut, and means for bolstering the blocks to hold them in a common shifting plane when the nut is tightened and including a bridging member wholly supported on and extending from block to block and sliding on at least one of the blocks and having a supporting eye receiving the screw for retaining it against deflection under tension; the blocks and said member having coplanar faces with mutual spline means to hold the blocks in alinement.

PHILIP N. ADAMS.

REFERENCES CITED

The following references are of record in the file of this patent:

UNITED STATES PATENTS

| Number | Name | Date |
| --- | --- | --- |
| 427,709 | Sherman | May 13, 1890 |
| 1,288,204 | Roscetta | Dec. 17, 1918 |
| 1,788,505 | Beard | Jan. 13, 1931 |
| 1,907,889 | Stauffer | May 9, 1933 |
| 2,359,418 | Hartman | Oct. 3, 1944 |

FOREIGN PATENTS

| Number | Country | Date |
| --- | --- | --- |
| 229,452 | Great Britain | Feb. 26, 1925 |
| 271,279 | Great Britain | May 26, 1927 |